(12) United States Patent
Bruchhage et al.

(10) Patent No.: US 7,699,483 B2
(45) Date of Patent: Apr. 20, 2010

(54) ILLUMINATION DEVICE

(75) Inventors: Walter Bruchhage, Lindlar (DE); Thomas Luft, Marienheide (DE)

(73) Assignee: Delphi Technologies, Inc., Troy, MI (US)

( * ) Notice: Subject to any disclaimer, the term of this patent is extended or adjusted under 35 U.S.C. 154(b) by 942 days.

(21) Appl. No.: 11/108,998

(22) Filed: Apr. 19, 2005

(65) Prior Publication Data
US 2005/0243567 A1 Nov. 3, 2005

(30) Foreign Application Priority Data
Apr. 19, 2004 (EP) .................................. 04009238

(51) Int. Cl.
F21V 9/16 (2006.01)
(52) U.S. Cl. .............................. 362/84; 362/23; 362/26; 362/27; 362/28; 362/29
(58) Field of Classification Search .................. 362/84, 362/23, 26, 27, 28, 29, 489, 491, 545, 234, 362/253, 800; 313/110, 512
See application file for complete search history.

(56) References Cited

U.S. PATENT DOCUMENTS

| | | | |
|---|---|---|---|
| 5,469,157 A * | 11/1995 | Carpenter et al. | 340/908.1 |
| 5,696,483 A | 12/1997 | Khalid et al. | |
| 6,168,280 B1 * | 1/2001 | Ozawa | 362/23 |
| 6,302,551 B1 * | 10/2001 | Matumoto | 362/27 |
| 6,502,968 B1 * | 1/2003 | Simon | 362/489 |
| 6,598,988 B1 * | 7/2003 | Noll et al. | 362/26 |
| 6,860,620 B2 * | 3/2005 | Kuan et al. | 362/294 |
| 2004/0213008 A1 * | 10/2004 | Bayersdorfer et al. | 362/491 |

FOREIGN PATENT DOCUMENTS

| | | |
|---|---|---|
| DE | 29606501 | 7/1996 |
| EP | 0777108 | 6/1997 |
| EP | 11794448 | 2/2002 |
| WO | 99/02897 | 1/1999 |

\* cited by examiner

*Primary Examiner*—Jong-Suk (James) Lee
*Assistant Examiner*—Mark Tsidulko
(74) *Attorney, Agent, or Firm*—Thomas N. Twomey

(57) ABSTRACT

A device for the illumination of a display, in particular of a transmission display of a motor vehicle, comprises an areal lighting means for an at least substantially uniform illumination of the total display in combination with at least one light emitting diode for an illumination of a respective individual display, in particular of a transmission position display offset in comparison with the uniform illustration of the total display, in particular a more intensive illustration of a respective individual display, in particular of a transmission position display.

11 Claims, 2 Drawing Sheets

ILLUMINATION DEVICE

TECHNICAL FIELD

The invention relates to a device for the illumination of a display, in particular a transmission display of a motor vehicle. Such an illumination device can include, for example, a capacitive or an interactive panel or display field.

BACKGROUND OF THE INVENTION

A problem of such illumination devices is a uniform illumination of the total display with a simultaneously offset illumination of a respective display position or single display such as in particular a transmission display, in particular a brighter illumination of a respective display position or single display such as in particular a transmission display.

SUMMARY OF THE INVENTION

It is the underlying object of the invention to provide an improved illumination device of the initially named kind in which the aforesaid problem has been eliminated. In this process, in particular a uniform illumination of the total display and an offset illumination of a respective individual position or individual display, in particular a transmission position display, in particular a brighter illumination of a respective individual position or individual display, in particular a transmission position display, should be ensured simultaneously in an economic and reliable manner.

This object is satisfied in accordance with the invention by the combination of an areal lighting means, for example of an electroluminescent foil, of an organic light emitting diode or of a flat light guide, for an at least substantially uniform illumination of the total display with at least one light emitting diode for an illumination of a respective individual display offset in comparison with the uniform illumination of the total display, in particular a more intensive illumination of a respective individual display, in particular of a transmission position display.

The uniform illumination of the total display is therefore ensured by an areal lighting means, whereas an illumination offset of a respective individual position or individual display in comparison to this uniform illumination of the total display, in particular a more intensive illumination of a respective individual position or individual display, in particular of a transmission position display, is ensured by means of at least one light emitting diode. The areal lighting means in the form of an electroluminescent foil, of an organic light emitting diode or of a flat light guide is capable of delivering the luminous intensity required for the uniform illumination of the total display without difficulty with a sufficient service life. Unlike with an electroluminescent foil or an organic light emitting diode, the increased luminous intensity required for the more intensive illumination of a respective individual position or individual display can be provided without problem without limitation of the service life of this electronic component with a light emitting diode (LED).

The more brightly illuminated individual display or transmission position could therefore generally likewise be achieved by an electroluminescent foil or an organic light emitting diode. The service life of such an electroluminescent foil or organic light emitting diode would, however, be greatly reduced by the required increased luminous intensity here. A uniform background illumination would only be possible with limitations here by a light color in combination with a differently colored functional illumination.

As regards the individual display positions or individual displays, these can, for example, be the positions "P-R-N-D" of the transmission position of a motor vehicle.

The illumination device preferably includes an at least partly transparent front face. The respective individual displays or individual positions of the transmission position can therefore be displayed via such an at least partly transparent front face.

Different types of stratification of the different light components or electronic components are feasible in their arrangement relative to one another.

In accordance with a preferred practical embodiment of the illumination device in accordance with the invention, the areal lighting means is simultaneously provided as a support for at least one electronic component, such as in particular at least one light emitting diode, for at least one electronic component serving for the control of the light emitting diode, at least one electronic component serving for the control of the areal component and/or at least one conductor track, in particular a flexible conductor track.

In this process, the electronic component or the conductor track is advantageously arranged on the light emitting side of the areal lighting means facing the at least partly transparent front face.

A protective foil or protective lacquer can be provided for the at least one conductor track.

Optionally, the illumination device can, for example, also include at least one driver (lamp driver) for the control of the electroluminescent foil and, optionally, resistors for the control of the light emitting diode.

For example, an embodiment of the illumination device with such a stratification of the light assemblies or of the electronic components is conceivable in which they are arranged relative to one another and successively to one another as follows:

front face, protective foil or protective lacquer, at least one light emitting diode, optionally with electronic components and conductor tracks, an areal lighting means adhesively bonded, printed or etched in the manner of FPC (FPC=flexible printed circuit) production to the conductor tracks on the light emitting side.

Expediently, a flexible printed circuit (FPC) fitted with at least one light emitting diode can also be arranged on the light emitting side of the areal lighting means facing the at least partly transparent front face. In this case, the flexible printed circuit (FPC) serves as a carrier of the at least one electronic component formed, for example, by a light emitting diode. The FPC is preferably at last partly translucent and/or cut out.

The flexible printed circuit preferably simultaneously serves as a carrier of at least one further electronic component such as in particular at least one electronic component serving for the control of the light emitting diode and/or at least one electronic component serving for the control of the areal lighting means or of the flexible printed circuit.

For example, such a stratification of the light assembly or of the electronic components is also possible in which these light assemblies or electronic components are arranged relative to one another and successively to one another as follows:

an at least partly transparent or translucent front face, a flexible printed circuit (FPC) fitted with at least one light emitting diode, an areal lighting means).

A respective electronic component can in each case be contacted and secured, for example, to the areal lighting means or to the in particular flexible conductor track or flexible printed circuit (FPC) by means of a conductive adhesive or solder.

With the two exemplary stratification designs previously mentioned, the light emitting diodes or further electronic components are each arranged, on the one hand, between the areal lighting means or the in particular flexible conductor track or flexible printed circuit (FPC) and, on the other hand, the at least partly transparent front face.

In a further expedient practical embodiment of the illumination device in accordance with the invention, the areal lighting means is provided with at least one insulated cut-out for an at least partial reception of a respective light emitting diode.

The areal lighting means can generally also be provided with at least one insulated cut-out for an at least partial reception of a respective further electronic component such as in particular of a respective electronic component serving for the control of the light emitting diode and/or of at least one respective electronic component serving for the control of the areal lighting means.

A flexible printed circuit (FPC) fitted with a least one light emitting diode and/or at least one further electronic component is preferably arranged at the side of the areal lighting means remote from the at least partly transparent front face.

For example, such a stratification of the different light assemblies or of the electronic components is therefore also possible in which these light assemblies or electronic components are arranged relative to one another and successively to one another as follows:

at least partly transparent or translucent front lenses, an areal lighting means with at least one insulated cut-out in the region of at least one light emitting diode and/or in the region of at least one further electronic component, a flexible printed circuit (FPC) fitted with at least one light emitting diode and/or at least one further electronic component.

BRIEF DESCRIPTION OF THE DRAWINGS

The invention will be explained in more detail in the following with reference to embodiments and to the drawing; in which are shown.

DESCRIPTION OF THE PREFERRED EMBODIMENT

Figure 1:
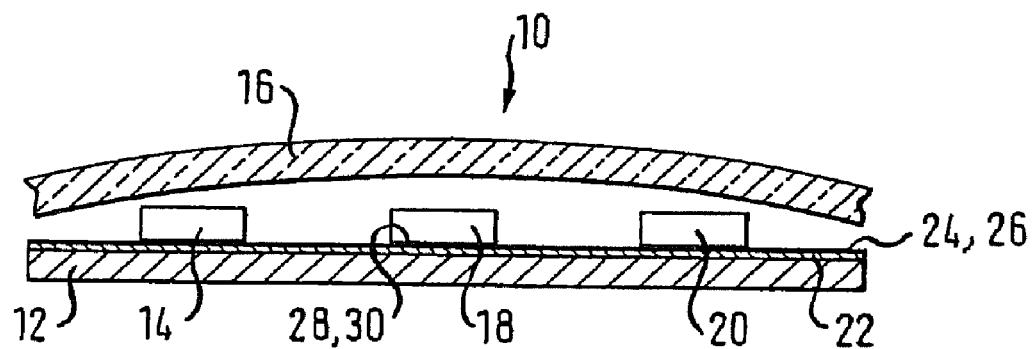
FIG. 1 is a simplified schematic representation of a device for the illumination of a display comprising an at least partly transparent front face, at least one light emitting diode and one areal lighting means, with the areal lighting means simultaneously serving as the carrier of the light emitting diode and, optionally, of at least one further electronic component and a protective foil or protective lacquer being provided for the conductor tracks.

FIG. 1 shows in a schematic simplified representation a first exemplary embodiment of a device 10 for the illumination of a display which can be a transmission display of a motor vehicle, for example.

The illumination device 10 comprises an areal lighting means which, in the embodiments shown, is an electroluminescent foil 12 for an at least substantially uniform illumination of the total display in combination with at least one light emitting diode 14 for an illumination of a respective individual position of the display or of the individual display offset in comparison with the uniform illumination of the total display, in particular a more intensive illumination of a respective individual position of the display or of the individual display, in particular of a transmission position display. The individual positions or individual displays can therefore in particular be the positions "P-R-N-D" of a transmission position display of a motor vehicle.

The illumination device 10 moreover comprises an at least partly transparent or translucent front face 16. The individual positions or individual displays can then be displayed via the light emitting diodes 14 in the front face 16.

The electroluminescent foil 12 serves in the present case not only as a carrier of at least one light emitting diode 14, but simultaneously also as the carrier of at least one further electronic component such as in particular at least one electronic component 18, such as a resistor for example, serving for the control of the light emitting diode 14, at least one electronic component 20, such as a lamp driver for example, serving for the control of the electroluminescent foil 12 and/or at least one conductor track 22 of which as a rule a plurality are provided and which can, for example, also be flexible conductor tracks.

A transparent protective foil 24 or a transparent protective lacquer 26 are expediently provided for the at least one conductor track 22.

As can be recognized with reference to FIG. 1, the electronic components 14, 18 to 26 or the conductor tracks 22 are arranged on the light emitting side of the electroluminescent foil 12 facing the at least partly transparent front face 16.

The electroluminescent foil 12 can be bonded, printed or etched in the manner of FPC production with the at least one conductor track 22 on its light emitting side facing the at least partly transparent front face 16.

The electronic components 14, 18, 20 or 22 can be contacted and secured by means of a conducting foil 28 or solder 30 to the electroluminescent foil 12 or to the conductor track 22 which can, for example, as already mentioned, also be a flexible conductor track.

FIG. 1 therefore shows an embodiment of the illumination device 10 with such a stratification of light assemblies or electronic components in which they are arranged relative to one another as follows:

front face 16, protective foil 24 or protective lacquer 26, at least one light emitting diode 14, optionally at least one further electronic component 18 to 26 such as in particular at least one electronic component 18, e.g. one or more resistors, serving for the control of the light emitting diode 14, at least one electronic component 20 such as a lamp driver serving for the control of the electroluminescent foil 12 and/or at least one conductor track 22 which can, as already mentioned, for example also be a flexible conductor track, an electroluminescent foil 12 which is bonded, printed or etched in the manner of FPC production to the conductor tracks 22 on the light emitting side facing the front cover 16.

Figure 2:
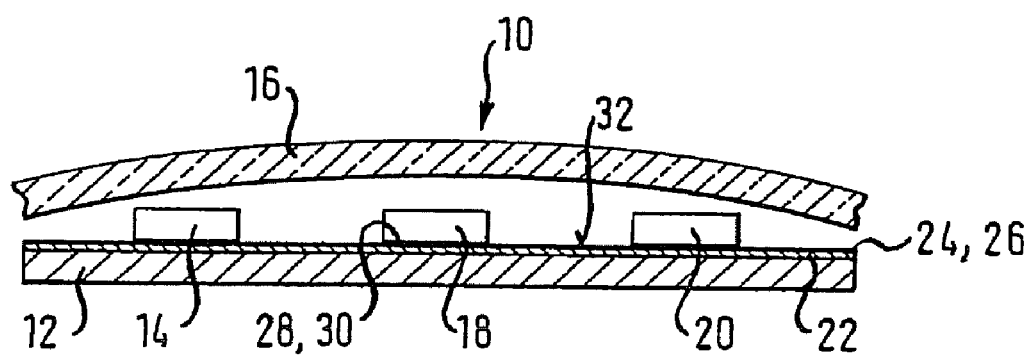
FIG. 2 is a simplified schematic representation of a further embodiment of the illumination device, with a flexible printed circuit fitted with at least one light emitting diode being arranged on the light emitting side of the areal lighting means facing the front face in this present case.

FIG. 2 shows, in a simplified schematic representation, a further embodiment of the illumination device 10. In the present case a flexible printed circuit 32 (FPC) fitted with at least one light emitting diode 14 is arranged on the light emitting side of the electroluminescent foil 12 facing the at least partly transparent front face 16. In this case, the flexible printed circuit 32 (FPC) therefore serves as a carrier of the electronic component formed by the light emitting diode 14.

The flexible printed circuit 32 (FPC) can simultaneously also serve as a carrier of at least one further electronic component, such as in particular at least one electronic component 18, for example one or more resistors, serving for the control of the light emitting diode 14 and/or at least one electronic component 20, for example a lamp driver, serving for the control of the electroluminescent foil 12 or flexible printed circuit 32 (FPC).

A protective foil 24 or protective lacquer 26 can again be provided for the conductor track(s) 22.

The electronic components 14, 18, 20 or 22 can again be contacted and secured to the flexible printed circuit 32 (FPC), by means of a conductive adhesive 28 or solder 30.

FIG. 2 therefore shows an embodiment of the illumination device 10 with such a stratification of the light assemblies or electronic components in which they are arranged relative to one another as follows:

front face 16, at least partly transparent or translucent flexible printed circuit 32 (FPC), fitted with at least one light emitting diode 14, electroluminescent foil 12.

With the two previously described embodiments in accordance with FIGS. 1 and 2, the at least one electronic component formed by a light emitting diode 14 or the at least one further electronic component 14, 18, 20 or 22 are arranged between, on the one hand, the electroluminescent foil 12 or the conductor track 22 or the flexible printed circuit 32 (FPC) and, on the other hand, the at least partly transparent front cover 16.

Figure 3:
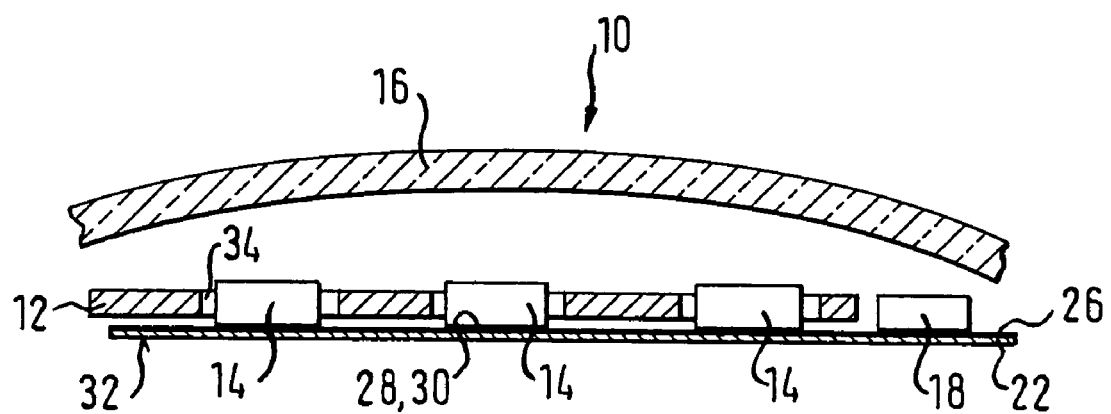
FIG. 3 is a simplified schematic representation of a further embodiment of the illumination device, with, in the present case, the areal lighting means being provided with at least one insulated cut-out for an at least partial reception of a respective light emitting diode and a flexible printed circuit fitted with at least one such light emitting diode being arranged on the side of the areal lighting means remote from the front face.

In the embodiment in accordance with FIG. 3, the electroluminescent foil 12 is provided with at least one insulated cut-out 34 for an at least partial reception of a respective light emitting diode 14. In the present case, a plurality of such light emitting diodes 14 are received in a respective insulated cut-out 34 of the electroluminescent foil 12. The electroluminescent foil 12 can furthermore be provided with at least one insulated cut-out 34 for an at least partial reception of a respective further electronic component such as in particular of a respective electronic component 18, for example at least one resistor, serving for the control of the light emitting diode 14 and/or of at least one electronic component 20, for example a lamp driver, respectively serving the control of the electroluminescent foil 12.

A flexible printed circuit 32 (FPC) fitted with at least one light emitting diode 14 and/or at least one further electronic component 14, 18, 20 or 22 is moreover arranged on the side of the electroluminescent foil 12 remote from the at least partly transparent front face 16.

A protective foil 24 or a protective lacquer 26 can in particular again be provided for the conductor track(s) provided in the region of the flexible printed circuit 32 (FPC).

The electronic components 14, 18, 20 or 22 can, for example, be contacted and secured to the flexible printed circuit 32 (FPC) by means of a conductive adhesive 28 or solder 30.

FIG. 3 therefore shows an embodiment of the illumination device 10 with such a stratification of the light assemblies or electronic components in which they are arranged relative to one another as follows:

front face 16, electroluminescent foil 12 with insulated cut-outs 34 in the region of the light emitting diodes 14, a flexible printed circuit 32 (FPC) which is fitted with at least one light emitting diode 14 and which can, optionally, additionally be fitted with further electronic components.

The invention claimed is:

1. A device for the illumination of a transmission display of a motor vehicle, comprising an areal lighting means configured to provide an at least substantially uniform illumination of the total display, said lighting means including at least one light emitting diode configured to provide an illumination of a respective individual selected gear display, differentiated in comparison with the uniform illumination of the total transmission display, said illumination comprising a more intensive illumination of the respective individual selected gear display, said at least one light emitting diode located on said areal lighting means,
at least one electronic component controlling said light emitting diode and located on said areal lighting means,
at least one electronic component controlling the areal lighting means and located on said areal lighting means,
wherein the areal lighting means provides a support for at least one light emitting diode, for said at least one electronic component controlling the light emitting diode, and for said at least one electronic component controlling the areal lighting means, and
wherein the device has at least one flexible conductor track connected to the at least one light emitting diode, the at least one electronic component controlling the light emitting diode and the at least one electronic component controlling the areal lighting means.

2. An illumination device in accordance with claim 1, further comprising an at least partly transparent front face covering over said areal lighting means, at least one electronic component controlling said light emitting diode, and at least one electronic component controlling the areal lighting means.

3. An illumination device in accordance with claim 2, wherein the areal lighting means is bonded, printed or etched in the manner of FPC production to the conductor track on its light emitting side facing the at least partly transparent front face.

4. An illumination device in accordance with claim 1, wherein the at least one electronic component is contacted and secured to the areal lighting means or to the flexible conductor track or to the flexible printed circuit by means of a conductive adhesive or solder.

5. An illumination device in accordance with claim 1, wherein the areal lighting means is an electroluminescent foil, an organic light emitting diode or a flat light guide.

6. A device for the illumination of a display, in particular of a transmission display of a motor vehicle, comprising an areal lighting means configured to provide an at least substantially uniform illumination of the total display, said lighting means including at least one light emitting diode configured to provide an illumination of a respective individual display, in particular of a selected gear display, differentiated in comparison with the uniform illumination of the total display, said illumination comprising a more intensive illumination of the respective individual display, said at least one light emitting diode located on said areal lighting means,
at least one electronic component controlling said light emitting diode and located on said areal lighting means,
at least one electronic component controlling the areal lighting means and located on said areal lighting means,
wherein the areal lighting means provides a support for at least one light emitting diode, for said at least one electronic component controlling the light emitting diode, and for said at least one electronic component controlling the areal lighting means, wherein the device has at least one flexible conductor track connected to the at least one light emitting diode, the at least one electronic component controlling the light emitting diode and the at least one electronic component controlling the areal lighting means, and wherein the device further comprises an at least partly transparent front face, and wherein said electronic components and the conductor track are arranged on the light emitting side of the areal lighting means facing the at least partly transparent front face and covered by said face.

7. An illumination device in accordance with claim 6 wherein a protective foil or a protective lacquer is provided for the at least one conductor track.

8. A device for the illumination of a display, in particular of a transmission display of a motor vehicle, comprising an areal lighting means configured to provide an at least substantially uniform illumination of the total display, said lighting means including at least one light emitting diode configured to provide an illumination of a respective individual display, in particular of a selected gear display, differentiated in comparison with the uniform illumination of the total display, said illumination comprising a more intensive illumination of the respective individual display, said at least one light emitting diode located on said areal lighting means, at least one electronic component controlling said light emitting diode and located on said areal lighting means, at least one electronic component controlling the areal lighting means and located on said areal lighting means, wherein the areal lighting means provides a support for said at least one light emitting diode, for said at least one electronic component controlling the light emitting diode, and for said at least one electronic component controlling the areal lighting means, wherein said device has at least one flexible conductor track connected to the at least one light emitting diode, the at least one electronic component controlling the light emitting diode and the at least one electronic component controlling the areal lighting means, and wherein the illumination device comprises an at least partly transparent front face, and a flexible printed circuit fitted with at least one light emitting diode is arranged on the light emitting side of the areal lighting means facing the at least partly transparent front face, and covered by said front face, whereby the flexible printed circuit serves as a carrier of the at least one light emitting diode.

9. An illumination device in accordance with claim 8 wherein the flexible printed circuit simultaneously serves as a carrier for at least one further electronic component serving for the control of the light emitting diode or at least one further electronic component serving for the control of the areal lighting means.

10. An illumination device in accordance with claim 9 wherein the at least one light emitting diode or the at least one further electronic component is arranged, on the one hand, between the areal lighting means or the flexible conductor track or the flexible printed circuit and, on the other hand, the at least partly transparent front face.

11. A device for the illumination of a display, in particular of a transmission display of a motor vehicle, comprising:

an areal lighting means configured to provide an at least substantially uniform illumination of the total display, at least one light emitting diode configured to provide an illumination of a respective individual display, in particular of a selected gear display, differentiated in comparison with the uniform illumination of the total display, said illumination comprising a more intensive illumination of the respective individual display, a flexible circuit board, said at least one light emitting diode located on said flexible circuit board, at least one electronic component controlling said light emitting diode and located on said flexible circuit board, at least one electronic component controlling the areal lighting means and located on said flexible circuit board, the areal lighting means having at least one insulated cut-out for an at least partial reception of a respective said at least one light emitting diode and with at least one insulated cut-out for an at least partial reception of said at least one electronic component controlling the light emitting diode or said at least one respective electronic component controlling the areal lighting means, the device further having an at least partly transparent front face, wherein a flexible printed circuit is fitted with the at least one light emitting diode, one of said electronic components being arranged on the side of the areal lighting means remote from the at least partly transparent front face, and the device having at least one flexible conductor track on said flexible printed circuit connected to the at least one light emitting diode, the at least one electronic component controlling the light emitting diode and the at least one electronic component controlling the areal lighting means.

* * * * *